United States Patent [19]

Nerini

[11] 4,111,060
[45] Sep. 5, 1978

[54] DRILL ATTACHMENT FOR CONVERTING ROTARY MOTION TO RECIPROCATORY MOTION

[76] Inventor: Fulvio Nerini, R.R. 1, Box 72-A, Bevier, Mo. 63532

[21] Appl. No.: 744,444

[22] Filed: Nov. 22, 1976

[51] Int. Cl.² ............ F16H 25/12; B27C 9/00; B25D 17/02
[52] U.S. Cl. ................................ 74/56; 144/1 E; 144/35 A; 173/29
[58] Field of Search .......... 74/56; 144/35 A, 1 E, 144/1 F; 173/29, 123

[56] References Cited

U.S. PATENT DOCUMENTS

| 1,588,832 | 6/1926 | Young | 74/56 |
| 1,665,173 | 4/1928 | Misener | 173/29 |
| 1,808,228 | 6/1931 | Hulack et al. | 144/35 A |
| 2,556,163 | 6/1951 | Beeson et al. | 173/123 X |
| 2,567,798 | 9/1951 | Bamberger | 74/56 X |

Primary Examiner—Carlton R. Croyle
Assistant Examiner—Leonard E. Smith
Attorney, Agent, or Firm—Fishburn, Gold & Litman

[57] ABSTRACT

A drill attachment for converting rotary motion of a drill chuck into reciprocatory motion includes a tool support member movable longitudinally along a guide bracket and having one surface with a plurality of cam surfaces thereon so that the movement thereof is in response to rotation of an elongated shaft having one end portion thereof received in the drill chuck and an enlarged portion on the other end of the shaft with a plurality of cam surfaces thereon and in engagement with the cam surfaces on the one surface of the tool support member. The cam surfaces on the tool support member and the cam surfaces on the enlarged portion of the shaft are resiliently retained in engagement one with the other.

8 Claims, 8 Drawing Figures

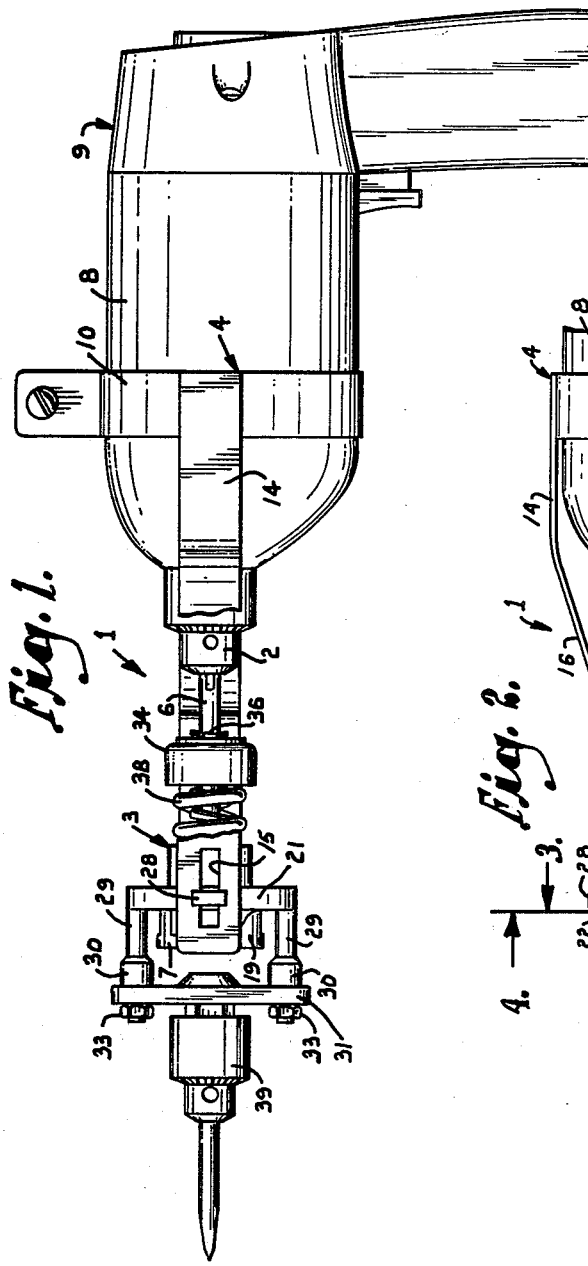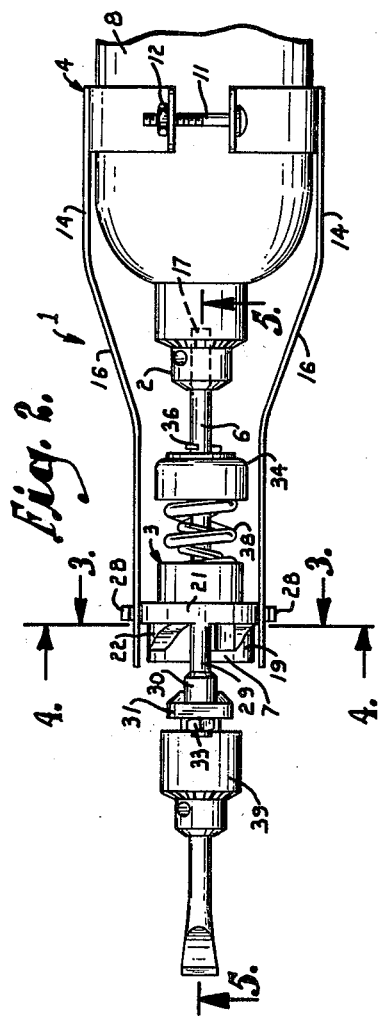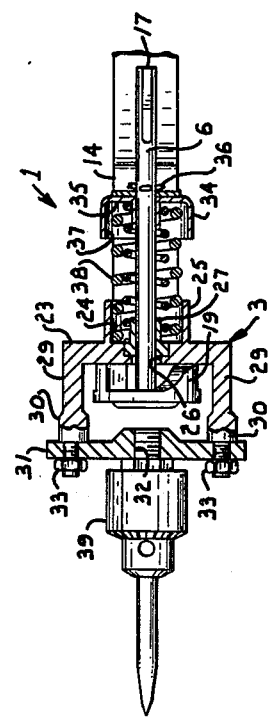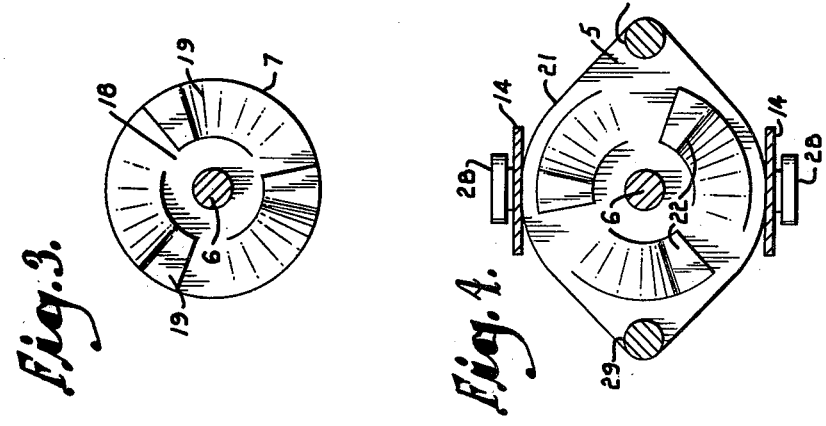

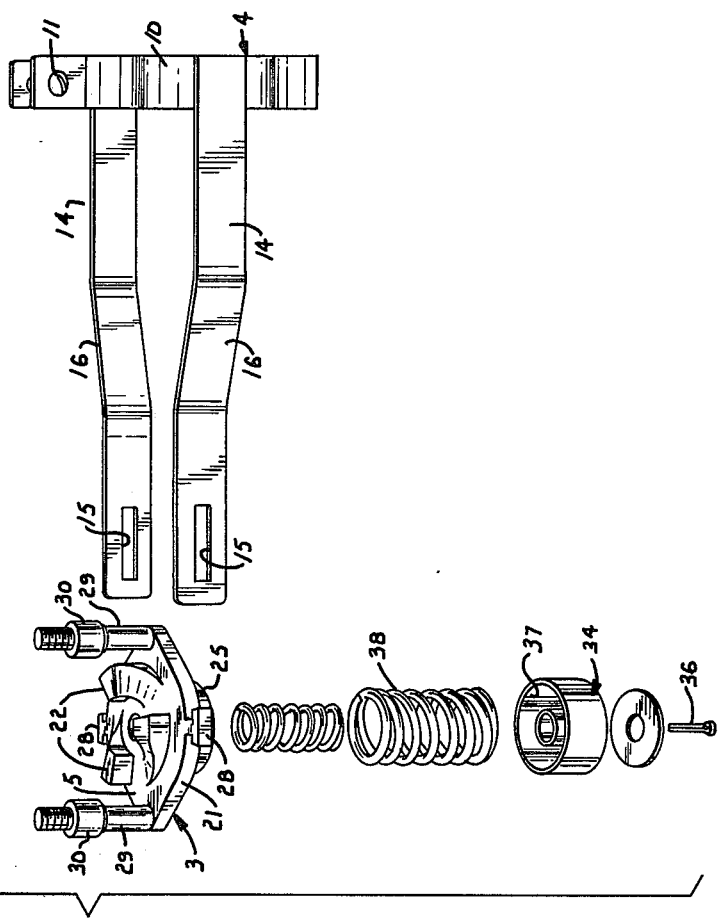
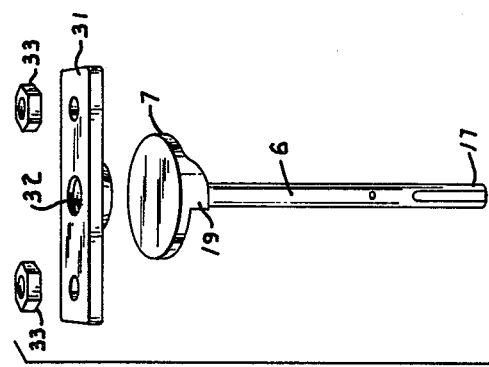
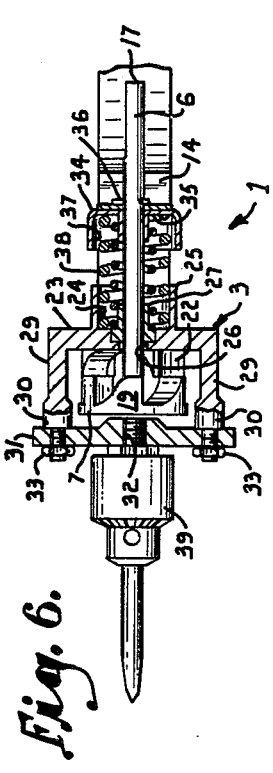
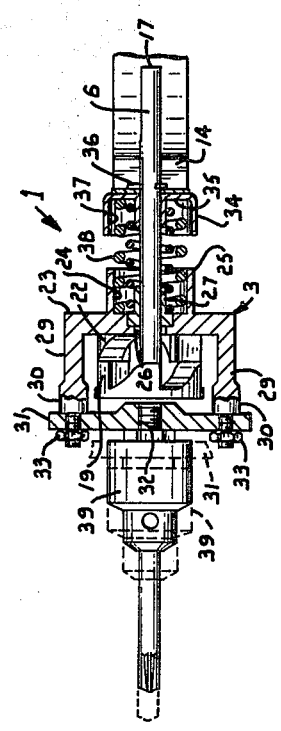

DRILL ATTACHMENT FOR CONVERTING ROTARY MOTION TO RECIPROCATORY MOTION

The present invention relates to drill attachments and more particularly to a drill attachment for converting rotary motion of a drill chuck into reciprocatory motion.

The principal objects of the present invention are: to provide an attachment for a power drill which is operative to convert rotary motion of a drill chuck to reciprocatory motion; to provide such a drill attachment wherein the reciprocatory motion is in longitudinal alignment with the center of the drill chuck; and to provide such a drill attachment which is easily mounted on a hand held power drill and which is economical to manufacture, simple in construction, reliable in operation, and particularly well adapted for the proposed use.

Other objects and advantages of this invention will become apparent from the following description taken in connection with the accompanying drawings wherein are set forth, by way of illustration and example, certain embodiments of this invention.

FIG. 1 is a side elevational view of a drill attachment for converting rotary motion to reciprocatory motion and embodying features of the present invention.

FIG. 2 is a top plan view of the drill attachment.

FIG. 3 is an enlarged transverse sectional view taken on line 3—3 of FIG. 2 and showing cam surfaces on a rotary shaft end portion.

FIG. 4 is an enlarged transverse sectional view taken on line 4—4 of FIG. 2 and showing cam surfaces on a body portion of a tool support member.

FIG. 5 is a fragmentary longitudinal sectional view through the drill attachment taken on line 5—5 of FIG. 2 and showing the components thereof in a retracted position.

FIG. 6 is a fragmentary transverse sectional view similar to FIG. 5 except showing the components in an extended position.

FIG. 7 is a fragmentary transverse sectional view similar to FIGS. 5 and 6 except showing an alternate tool and an alternate position thereof in broken lines.

FIG. 8 is an exploded perspective view of the drill attachment and showing the tool support member in position for mounting on the guide bracket.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed example, the reference numeral 1 designates generally a drill attachment for converting rotary motion of a drill chuck 2 into reciprocatory motion. The drill attachment 1 includes a tool support member 3 movable longitudinally along a guide bracket 4 and having one surface 5 with a plurality of cam surfaces thereon so that the movement thereof is in response to rotation of an elongated shaft 6 having one end portion thereof received in the drill chuck 2 and an enlarged portion 7 on the other end of the elongated shaft 6 with a plurality of cam surfaces thereon and in engagement with the cam surfaces on the tool support member one surface 5. The cam surfaces on the tool support member 3 and the cam surfaces on the enlarged portion 7 of the elongated shaft 6 are resiliently retained in engagement one with the other.

The drill attachment 1 is mounted on the housing 8 of a hand held power drill 9. The guide bracket 4 of the drill attachment 1 includes a collar member 10 formed of a bar or strap held in clamping engagement with an exterior surface of a drill housing 8, as by a suitable adjustable fastening member, such as a bolt or bolts 11 with a nut or nuts 12 mounted thereon. The guide bracket 4 includes a plurality of longitudinally extending arms 14. In the illustrated embodiment, the guide bracket 4 has a pair of laterally spaced arms 14 also formed of planar bars or straps and each having an elongated longitudinally extending guide slot 15 therein, for a purpose later described. The illustrated arms 14 of the guide bracket 4 each include an offset portion 16 between the collar member 10 and the respective free end portion thereof having the guide slot 15 therein.

The elongated shaft 6 of the drill attachment 1 has one end portion 17 thereof adapted to be received in the drill chuck 2, as by having a suitable flat surface thereon. The enlarged portion 7 on the other end portion of the elongated shaft 6 is illustrated as a disc with one surface 18 thereof in facing relation with the drill chuck 2 and having a plurality of cam surfaces 19 thereon. The cam surfaces 19 are circumferentially spaced and surround the elongated shaft 6.

The tool support member 3 is movable longitudinally along the guide bracket 4 and has one surface 5 of a body portion 21 thereof in facing relation with the one surface 18 of the shaft enlarged portions 7. The tool support member one surface 5 has a plurality of cam surfaces 22 thereon. The tool support member cam surfaces 22 are also circumferentially spaced and are engageable with the cam surfaces 19 on the shaft enlarged portion 7 so that rotation of the elongated shaft 6 effects longitudinal movement of the tool support member 3 relative to the elongated shaft 6 and the guide bracket arms 14.

The body portion 21 has an opposite surface 23 positioned in facing relation with the drill chuck 2 and has means thereon defining a recess 24 extending longitudinally of the axis of the elongated shaft 6. In the illustrated embodiment, a wall member 25 extends outwardly from the other or opposite surface 23 of the tool support member body portion 21 and defines a generally cylindrical recess 24. The body portion 21 includes a bore 26 therethrough to permit the elongated shaft 6 to extend through the body portion 21. A suitable bushing 27 is mounted in the bore 26 and has a portion thereof extending into the recess 24 with the elongated shaft 6 extending therethrough.

The body portion 21 of the tool support member 3 includes a plurality of ears 28 extending outwardly therefrom and each received in a respective one of the guide slots 15 in the guide bracket arms 14. In the illustrated embodiment, a pair of ears 28 extend from the tool support member body portion 21 and are positioned in diametrically opposed relation. The ears 28 are each generally T-shaped so that the body portion 21 may be mounted on the guide bracket arms 14 with the ears 28 in the guide slots 15 and then rotated or turned ninety degrees to thereby position the bore 26 and bushing 27 in longitudinal alignment with the axis of the drill chuck 2 so that the elongated shaft 6 may be mounted in the drill attachment 1.

The body portion 21 includes a plurality of circumferentially spaced arms or studs 29 extending therefrom and each positioned substantially parallel with the longitudinal axis of the elongated shaft 6 when it is mounted in the bore 26 and the bushing 27. In the illustrated embodiment, there are two diametrically opposed arms or studs 29 extending from the body portion 21 and each arm 29 is positioned between and at a ninety degree spacing from each of the ears 28. Each of the arms 29 has an enlarged portion or abutment 30 thereon and positioned intermediate the body portion 21 and the free end of the respective arm 29. Suitable threads are formed on the free end portion of the arms 29, for a purpose later described.

A chuck mounting member 31 is mounted on and extends between the body portion arms 29. In the illustrated embodiment, the chuck mounting member 31 is an enlarged generally planar bar having an enlarged center portion with a threaded bore 32 therein. The threaded bore 32 in the chuck mounting member 31 and the bore 26 in the body portion 21 are coaxial when the chuck mounting member 31 is mounted on the studs 29, as by nuts 33 positioned on the threaded free end portions of the arms 29.

The cam surfaces 22 on the one surface 5 of the body portion 21 are resiliently maintained in engagement with the cam surfaces 19 on the one surface 18 of the enlarged portion 7 of the elongated shaft 6. In the illustrated embodiment, abutment means 34 are mounted on the elongated shaft 6 and positioned intermediate the ends thereof and spaced from the recessed defining wall member 25 of the tool support member 3. The abutment means 34 is illustrated as being formed of a generally planar end wall 35 sleeved on the elongated shaft 6 and held in position by a suitable retainer, such as a cotter pin 36 or an adjusting nut (not shown). A side wall 37 extends from the periphery of the end wall 35 and thereby defines a recess for receiving one end portion of an elongated resilient member 38 received therein.

The resilient member 38 is sleeved on the elongated shaft 6 and has the other end portion thereof received in the recess 24 defined by the wall member 25 extending from the body portion 21. The resilient member 38 is illustrated as a double spring sleeved on the elongated shaft 6.

In assembly of the drill attachment 1, the ears 28 are inserted into the respective guide slots 15 in the guide bracket arms 14. The body portion 21 of the tool supporting member 3 is then rotated ninety degrees, thereby positioning the axis of the bore 26 substantially parallel with the arms 14 of the guide bracket 4. The elongated shaft 6 is then located within the bore 26 and the bushing 27 and the enlarged portion 7 is positioned with the cam surfaces 19 thereon in engagement with the cam surfaces 22 on the body portion 21. The resilient member 38 is sleeved on the elongated shaft 6 and the abutment means 34 is then sleeved on the shaft 6. The resilient member 38 is compressed until the retainer or cotter pin 36 is mounted on the elongated shaft 6 and the chuck mounting member 31 is suitably secured on the arms of the body portion 21, as by the nuts 33. A suitable chuck 39 is mounted in the threaded bore 32. The assembled attachment is then mounted on the housing 8 of the power drill 9 and the collar member 10 is moved into clamping engagement with the drill housing 8 after the one end 17 of the elongated shaft 6 is received in the drill chuck 2.

In using an assembled drill attachment, a selected tool, such as a chisel or star drill, is mounted in the chuck 39 on the chuck mounting member 31. Upon rotation of the elongated shaft 6 by operation of the power drill 9, the cam surfaces 19 on the shaft enlarged portion 7 turn relative to the tool support member cam surfaces 22 and thereby effect longitudinal movement of the tool support member 3 relative to the elongated shaft 6 and the guide bracket arms 14. The ears 28 extending outwardly from the tool support member body portion 21 are retained in the guide slots 15 in the guide bracket arms 14 so that the tool support member 3 does not rotate relative to the elongated shaft 6. The resilient member 38 maintains the tool support member cam surfaces 22 in engagement with the shaft enlarged portion cam surfaces 19 whereby the tool support member 3 reciprocates in response to rotary motion of the drill chuck 2 and the elongated shaft 6.

It is to be understood that while one form of the invention has been illustrated and described, it is not to be limited to the specific form or arrangement of parts herein described and shown.

What is claimed and desired to secure by Letters Patent is:

1. A drill attachment for converting rotary motion to reciprocatory motion and comprising:
    (a) a guide bracket mounted on a drill housing and having a plurality of longitudinally extending arms;
    (b) an elongated shaft having one end portion thereof adapted to be received in a drill chuck and an enlarged portion on the other end thereof;
    (c) means on said shaft enlarged portion defining a plurality of circumferentially spaced cam surfaces surrounding the axis of said shaft;
    (d) a tool support member movable longitudinally along and having a slideable connecting means slideably engaging without rotation said guide bracket arms and having one surface in facing relation with said enlarged portion of said shaft, said tool support member one surface having means thereon defining a plurality of circumferentially spaced cam surfaces engageable with said cam surfaces on said shaft enlarged portion, said tool support member one surface being resiliently urged into engagement with said shaft enlarged portion and the cam surfaces thereon;
    (e) a chuck mounted on said tool support member for retaining therein a selected tool, said chuck being movable with said tool support member;
    (f) said elongated shaft includes abutment means mounted thereon and positioned intermediate the ends thereof;
    (g) said tool support member includes a body portion and means thereon defining a recess in facing relation with said abutment means on said elongated shaft; and
    (h) an elongated resilient member is sleeved on said elongated shaft with one end portion in engagement with said abutment means and an other end portion received in the recess in said body portion of said tool support member.

2. In combination:
    (a) a power drill having a housing and a drill chuck and means for selectively rotating said drill chuck;
    (b) a guide bracket mounted on said drill housing and having a pair of laterally spaced arms each having a free end portion thereof spaced from said drill housing;

(c) an elongated shaft having one end portion thereof received in said drill chuck and an enlarged portion on the other end thereof;

(d) means on one surface of said shaft enlarged portion defining a plurality of circumferentially spaced cam surfaces surrounding said shaft;

(e) a tool support member sleeved on said shaft and movable longitudinally along and having a slideable connecting means slideably engaging said guide bracket arms and having one surface thereof in facing relation with said one surface of said shaft enlarged portion;

(f) means on said tool support member one surface defining a plurality of circumferentially spaced cam surfaces engageable with said cam surfaces on said shaft enlarged portion;

(g) resilient means in engagement with said tool support member for urging said tool support member one surface into engagement with said one surface of said shaft enlarged portion and the cam surfaces thereon;

(h) a chuck mounted on said tool support member for retaining therein a selected tool, said chuck being movable with said tool support member;

(i) said elongated shaft includes abutment means mounted thereon and positioned intermediate the ends thereof;

(j) said abutment means includes a side wall defining a recess;

(k) said tool support member includes a body portion and means thereon defining a recess in facing relation with said abutment means on said elongated shaft; and (l) said resilient means comprises an elongated resilient member sleeved on said elongated shaft and having opposite ends thereof received in said recess in said abutment means and said recess in said tool support member respectively.

3. A drill attachment for converting rotary motion to reciprocatory motion and comprising:

(a) a guide bracket mounted on a drill housing and having a plurality of longitudinally extending arms;

(b) an elongated shaft having one end portion thereof adapted to be received in a drill chuck and an enlarged portion on the other end thereof;

(c) means on said shaft enlarged portion defining a plurality of circumferentially spaced cam surfaces surrounding the axis of said shaft;

(d) a tool support member movable longitudinally along said guide bracket arms and having one surface in facing relation with said enlarged portion of said shaft, said tool support member one surface having means thereon defining a plurality of circumferentially spaced cam surfaces engageable with said cam surfaces on said shaft enlarged portion, said tool support member one surface being resiliently urged into engagement with said shaft enlarged portion and the cam surfaces thereon;

(e) a chuck mounted on said tool support member for retaining therein a selected tool, said chuck being movable with said tool support member; said tool support member including:

(f) a body portion having a plurality of circumferentially spaced arms extending therefrom and each positioned substantially parallel with the longitudinal axis of said elongated shaft, and (g) a chuck mounting member mounted on and extending between said body portion arms, and (h) means on said chuck mounting member and longitudinally aligned with said elongated shaft for removably mounting said chuck thereon.

4. A drill attachment as set forth in claim 3 wherein:

(a) said tool support member body portion includes a plurality of circumferentially spaced ears extending outwardly therefrom; and (b) said guide bracket arms each have a respective elongated longitudinally extending guide slot therein each having a respective one of said tool support member ears received therein.

5. A drill attachment as set forth in claim 4 wherein:

(a) said elongated shaft includes abutment means mounted thereon and positioned intermediate the ends thereof;

(b) said tool support member body portion includes means thereon defining a recess in facing relation with said abutment means on said elongated shaft; and (c) an elongated resilient member is sleeved on said elongated shaft with one end portion in engagement with said abutment means and an other end portion received in the recess in said body portion of said tool support member.

6. In combination:

(a) a power drill having a housing and a drill chuck and means for selectively rotating said drill chuck;

(b) a guide bracket mounted on said drill housing and having a pair of laterally spaced arms each having a free end portion thereof spaced from said drill housing;

(c) an elongated shaft having one end portion thereof received in said drill chuck and an enlarged portion on the other end thereof;

(d) means on one surface of said shaft enlarged portion defining a plurality of circumferentially spaced cam surfaces surrounding said shaft;

(e) a tool support member sleeved on said shaft and movable longitudinally along said guide bracket arms and having one surface thereof in facing relation with said one surface of said shaft enlarged portion;

(f) means on said tool support member one surface defining a plurality of circumferentially spaced cam surfaces engageable with said cam surfaces on said shaft enlarged portion;

(g) resilient means in engagement with said tool support member for urging said tool support member one surface into engagement with said one surface of said shaft enlarged portion and the cam surfaces thereon; and (h) a chuck mounted on said tool support member for retaining therein a selected tool, said chuck being movable with said tool support member; said tool support member including:

(i) a body portion having a pair of diametrically opposed arms extending therefrom and each positioned substantially parallel with the longitudinal axis of said elongated shaft, (j) a chuck mounting member mounted on and extending between said body portion arms, and (k) means on said chuck mounting member and longitudinally aligned with said elongated shaft for removably mounting said chuck thereon.

7. The combination as set forth in claim 6 wherein:

(a) said tool support member body portion includes a pair of diametrically opposed ears extending outwardly therefrom; and
(b) said guide bracket arms each have a respective elongated longitudinally extending guide slot therein having a respective one of said tool support member ears received therein.

8. In combination as set forth in claim 7 wherein:
(a) said elongated shaft includes abutment means mounted thereon and positioned intermediate the ends thereof;
(b) said abutment means includes a side wall defining a recess;
(c) said tool support member includes a body portion and means thereon defining a recess in facing relation with said abutment means on said elongated shaft; and
(d) said resilient means comprises an elongated resilient member sleeved on said elongated shaft and having opposite ends thereof received in said recess in said abutment means and said recess in said tool support member respectively.

* * * * *